United States Patent
Omura

(10) Patent No.: US 9,786,965 B2
(45) Date of Patent: Oct. 10, 2017

(54) POWER SOURCE DEVICE

(71) Applicant: SANYO Electric Co., Ltd., Osaka (JP)

(72) Inventor: Tetsuji Omura, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/314,912

(22) PCT Filed: Jun. 26, 2015

(86) PCT No.: PCT/JP2015/003215
§ 371 (c)(1),
(2) Date: Nov. 29, 2016

(87) PCT Pub. No.: WO2014/002178
PCT Pub. Date: Jan. 7, 2016

(65) Prior Publication Data
US 2017/0194676 A1    Jul. 6, 2017

(30) Foreign Application Priority Data
Jul. 2, 2014   (JP) ................. 2014-136526

(51) Int. Cl.
*H01M 2/10* (2006.01)
*H01M 10/613* (2014.01)
(Continued)

(52) U.S. Cl.
CPC ....... *H01M 10/613* (2015.04); *H01M 2/1077* (2013.01); *H01M 10/625* (2015.04);
(Continued)

(58) Field of Classification Search
CPC ............. H01M 2/1077; H01M 10/613; H01M 10/625; H01M 10/653; H01M 10/6562; H01M 2250/20
See application file for complete search history.

(56) References Cited

U.S. PATENT DOCUMENTS

2011/0206948 A1   8/2011   Asai et al.
2012/0141855 A1   6/2012   Okada et al.

FOREIGN PATENT DOCUMENTS

JP   2011-175743   9/2011
JP   2012-123905   6/2012

OTHER PUBLICATIONS

International Search Report of PCT application No. PCT/JP2015/003215 dated Aug. 18, 2015.

*Primary Examiner* — Brittany Raymond
(74) *Attorney, Agent, or Firm* — Wenderoth, Lind & Ponack, L.L.P.

(57) ABSTRACT

A power source device comprises: a battery module having a rectangular parallelepiped shape including a battery stacked body having a plurality of battery cells stacked in one direction, a pair of end plates respectively disposed on a first end surface and a second end surface located at two ends of the battery stacked body, and a constraining member coupled to the pair of the end plates. Further, the power source device comprises: a frame having a fastening surface; fastening members for fastening the battery module in such a state that one surface of the battery module adjacent to the first end face and the second end face faces the fastening surface. The constraining member is formed such that a hardness of the constraining member becomes stronger against an external force applied to a stacked direction of the plurality of battery cells as the constraining member goes away from the fastening surface.

8 Claims, 11 Drawing Sheets

(51) Int. Cl.
 *H01M 10/625* (2014.01)
 *H01M 10/653* (2014.01)
 *H01M 10/6562* (2014.01)
(52) U.S. Cl.
 CPC ..... *H01M 10/653* (2015.04); *H01M 10/6562* (2015.04); *H01M 2250/20* (2013.01)

POWER SOURCE DEVICE

CROSS-REFERENCE TO RELATED APPLICATIONS

This application is a U.S. national stage application of the PCT International Application No. PCT/JP2015/003215 filed on Jun. 26, 2015, which claims the benefit of foreign priority of Japanese patent application No. 2014-136526 filed on Jul. 2, 2014, the contents all of which are incorporated herein by reference.

TECHNICAL FIELD

The present invention relates to a power source device having a battery module where a plurality of battery cells are assembled.

BACKGROUND ART

Recently, hybrid cars or electric vehicles are widely spread. A driving motor is mounted on such a vehicle, and a power source device for supplying power to the driving motor, is also mounted. lithium ion batteries, or nickel hydride batteries are generally used for the power source device for the vehicle.

By assembling a plurality of battery modules, this type of the power source device is often configured. In a case where a high output of the power source device is designed, a battery module including a plurality of battery cells connected in series, is used. In a case where a high capacity of the power source device is designed, a battery module including a plurality of battery cells connected in parallel, is used. In this way, the battery module is configured by connecting the plurality of the battery cells in the combination of series-connection or parallel-connection, according to a required performance of the power source device.

Since the battery cell is swollen and contracted corresponding to charge discharge or degradation, the battery module is formed by constraining and assembling the plurality of the battery cells. The battery source device having this type of the battery module is proposed in Patent Literature 1 as described in the following. A power source device includes a plurality of battery cells stacked in one direction, a pair of end plates respectively disposed on both ends, and constraining members coupled to the pair of the end plates. In the power source device of Patent Literature 1, the constraining members are respectively disposed at both side surfaces of the battery module, and coupled to the end plates. This configuration suppresses the swell of the battery cell through the constraining members and the end plates.

In the above-mentioned configuration, the constraining members press the battery cells through the end plates, and also its reaction force is applied to the constraining members. Concretely, a tensile force is applied to the constraining members in the stacked direction of the battery cells. Therefore, an experiment or the like in each of the battery module is carried out in advance, and then an external force (tensile force) which is applied to the constraining members due to the swells of the battery cells, is estimated. Then, in order not to break the constraining members against the estimated external force, a material, thickness, shape, or the like of the constraining member is designed.

In a case where the power source device is mounted on a vehicle, many types of the configurations can be adopted. Generally, assembling the vehicle and assembling the power source device are carried out in separate processes. Therefore, in a case where the power source device is mounted on the vehicle, the configuration where the battery module is fixed to a plate, outer case, or the like, is often adopted. For example, in a case of the power source device of Patent Literature 1, the battery module is mounted on the outer case, and the configuration where the end plates are fixed to the outer case can be adopted. Concretely, through-holes for fixing are provided at the end plates, and the battery module is fixed to the outer case through fastening members such as bolts. According to this configuration, since the power source device is mounted on the vehicle by fixing the frame such as a plate, or an outer case to the vehicle body, the power source device in the assembled state can be easily fixed to the vehicle.

CITATION LIST

Patent Literature

Patent Literature 1: Japanese Laid-Open Patent Publication No. 2011-175743.

SUMMARY OF THE INVENTION

As mentioned above, the constraining members are designed such that the constraining members have the hardness against the tensile forces in the stacked direction of the battery cells, but the inventors of the present invention find out that the stresses in the constraining members due to distortion deformation occur in a state where the battery module is fixed to the frame when the battery cells are swollen.

Concretely, in a state where the battery module is fixed to the frame, when the battery cells are swollen, it is understood that the end plates are asymmetrically displaced to a center axis of a battery stacked body extending in the stacked direction of the battery cells. When the end plates are asymmetrically displaced to the center axis of the battery stacked body, distortion occurs in the constraining member, and stress concentration caused by the distortion deformation occurs in the constraining member. In the conventional configuration, since only the tensile force caused by the swell of the battery cell is considered, when strong distortion occurs, the constraining member may be broken.

The present invention is developed for the purpose of solving such drawbacks. Its object is to provides a technology where distortion deformation of a constraining member is suppressed and a break or damage of the constraining member is prevented.

To resolve such a problem, a power source device of one aspect of the present invention of comprises: a battery module having a rectangular parallelepiped shape including a battery stacked body having a plurality of battery cells stacked in one direction, a pair of end plates respectively disposed on a first end surface and a second end surface located at two ends of the battery stacked body, and a constraining member coupled to the pair of the end plates. Further, the power source device comprises: a frame having a fastening surface; fastening members for fastening the battery module in such a state that one surface of the battery module adjacent to the first end surface and the second end surface faces the fastening surface. The constraining member is formed such that a hardness of the constraining member becomes stronger against an external force applied to a stacked direction of the plurality of battery cells as the constraining member goes away from the fastening surface.

According to the present invention, displacement of the end plate can be effectively suppressed, and a break or damage of the constraining member can be prevented.

DESCRIPTION OF EMBODIMENTS

Figure 1:
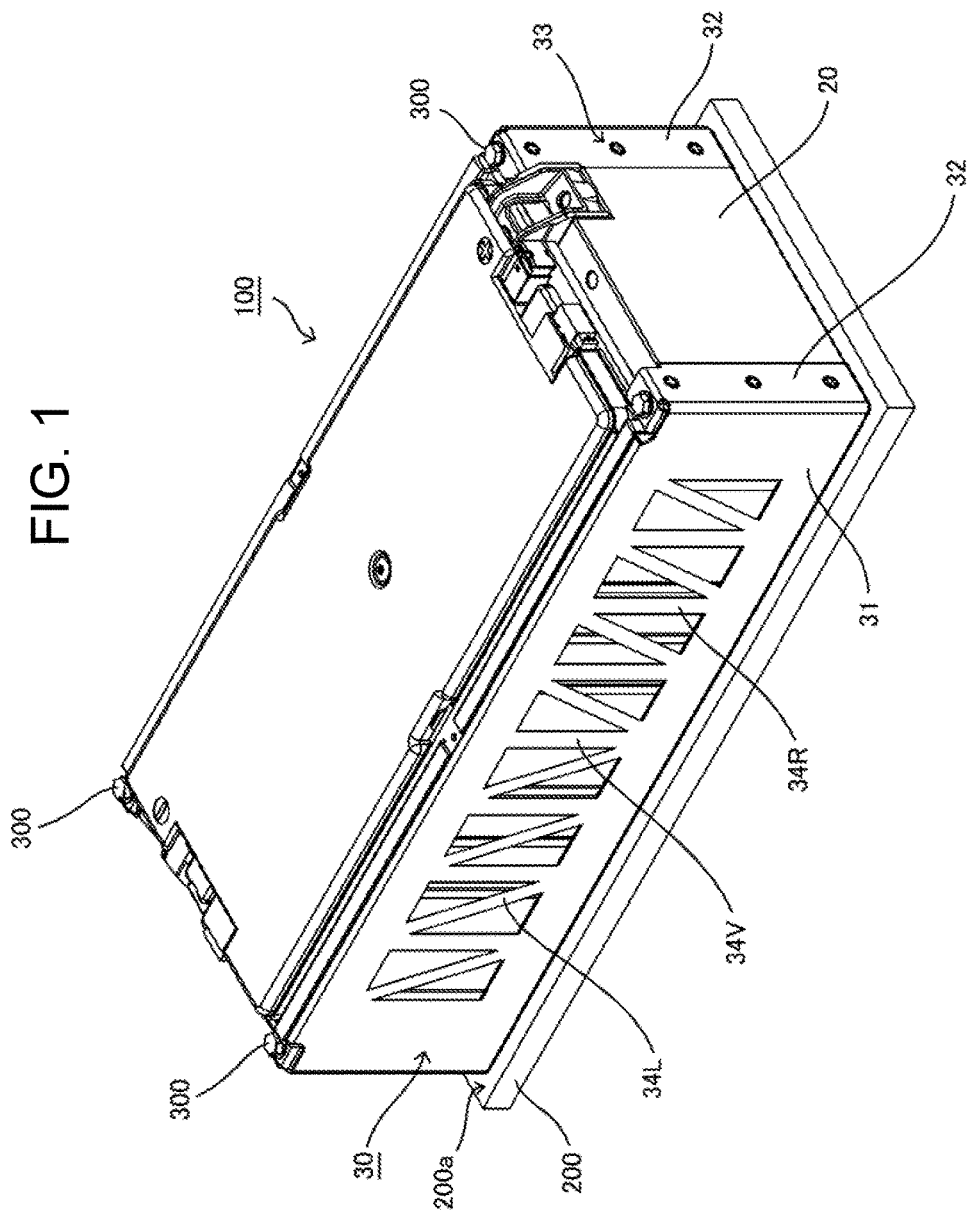
FIG. 1 is a perspective view of a battery module in an embodiment of the present invention.

A power source device of one embodiment of the present invention includes at least one battery module 100, and is mounted on a vehicle such as a hybrid car, or an electric vehicle. Here, the power source device includes an electric part such as an electric circuit board (not shown in figures) on which a monitoring portion for monitoring a state of battery module 100 is mounted. As shown in FIG. 1, battery module 100 is fixed to frame 200 such as an outer case, or a plate through fastening members 300 such as bolts. The power source device is fixed to the vehicle through this frame 200. Here, frame 200 may be a member constituting a part of the vehicle.

Figure 2:
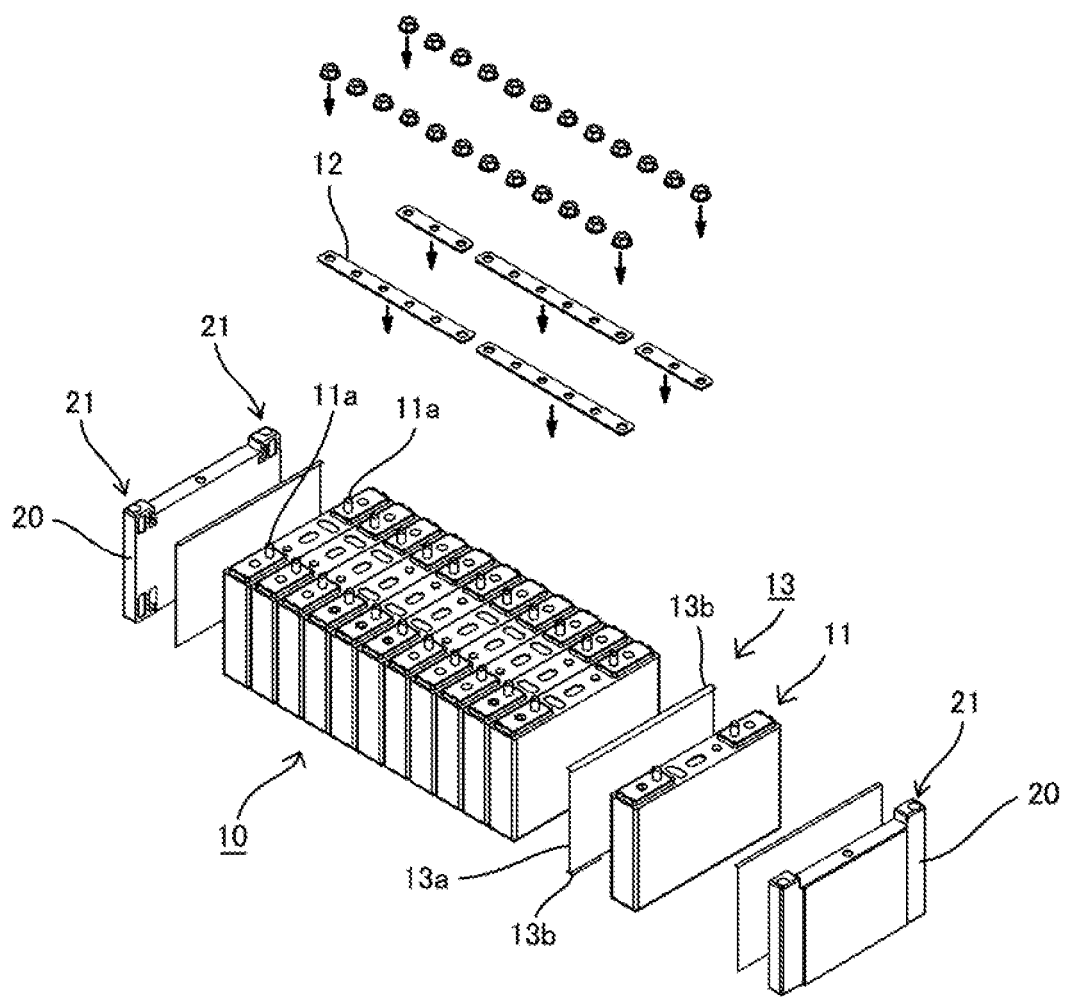
FIG. 2 is an exploded perspective view illustrating a battery stacked body in the embodiment of the present invention.

FIGS. 1 and 2 are figures illustrating battery module 100 in the embodiment of the present invention. Battery module 100 includes battery stacked body 10 having a plurality of battery cells 11, a pair of end plates 20 respectively disposed on both ends of battery stacked body 10, and constraining members 30 coupled to the pair of end plates 20 and assembling battery stacked body 10.

As shown in FIG. 2, each of battery cells 11 is a rectangular battery (prismatic battery) having a flat rectangular parallelepiped shape of an outer can. The outer can is made of metal, and power generation elements such as electrode plates, and electrolyte are sealed inside the outer can. Positive or negative electrode terminals 11a are provided on the upper surface of the outer can. The stored power of battery cells 11 are output from positive and negative electrode terminals 11a.

Battery cells 11 are stacked in one direction in a state where electrode terminals 11a face upward, and battery cells 11 constitute battery stacked body 10. Positive and negative electrode terminals 11a are provided at both ends on the upper surface of the outer can. Then, by inverting battery cells 11, positive and negative electrode terminals of adjacent battery cells 11 can be closely disposed. Closely disposed positive and negative electrode terminals 11a are connected by bus-bars 12, and then adjacent battery cells 11 are connected in series. Here, in a case where electrode terminals 11a of the same polarity are closely disposed, adjacent battery cells 11 may be connected in parallel through bus-bars 12. In the battery module shown in FIG. 2 as one example, electrode terminals 11a of six battery cells 11 are connected by one bus-bar 12, and then groups where three battery cells 11 are connected in parallel by bus-bar 12 in each of groups, are connected in series.

In the plurality of battery cells 11 configuring battery stacked body 10, spacers 13 are respectively disposed between adjacent battery cells 11. Spacers 13 are made of insulation resin, and respectively insulate between adjacent battery cells 11. As the outer can of battery cell 11 has the electric potential because of the outer can made of metal, it is necessary to insulate adjacent battery cells 11 from each other by using spacers 13. As the configuration insulating adjacent battery cells 11 other than spacers 13, it is known that the outer can of the battery cell is covered with an insulation sheet. One example of this configuration is a heat shrink tube having a heat contraction property. The heat shrink tube is an insulation sheet which is shrunk or contracted by adding heat, and has an excellent productivity. However, the strength of the heat shrink tube is comparatively weak. Therefore, in order to ensure a reliability of the insulation, a configuration having both of spacers 13 and heat shrink tubes can be adopted.

Figure 3:
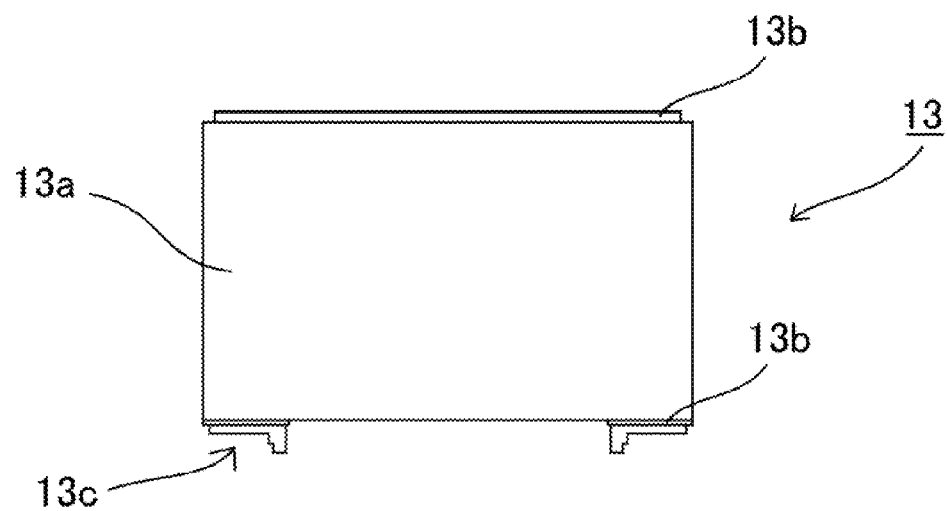
FIG. 3 is a front view of a separator in the embodiment of the present invention.

As shown in FIGS. 2 and 3, each of spacers 13 includes insulation portion 13a which is located between facing surfaces of adjacent battery cells 11, and ribs 13b which project from insulation portion 13a toward battery cell 11 so as to cover parts of an upper surface, side surfaces, or a bottom surface of battery cell 11. Spacer 13 having a plurality of ribs 13b can fit battery cell 11 between ribs 13b, and suppresses misalignment of battery cells 11 at a time of stacking battery cells 11. Further, as necessary, spacer 13 may have grooves (not shown in figures) at its surface of insulation portion 13a facing battery cell 11. According to this configuration, gaps between battery cell 11 and insulation portion 13a are formed, and then battery cell 11 can be cooled by blowing cooling wind through the gaps.

As mentioned above, the pair of end plates 20 are disposed at both ends of battery stacked body 10. Concretely, the pair of end plates 20 are respectively disposed at a pair of end surfaces which are located at both ends of battery stacked body 10 in the stacked direction of battery cells 11.

Constraining members 30 extending in the stacked direction of battery cells 11, are fixed to the pair of the end plates 20. Constraining members 30 constrain battery stacked body 10 which is compressed in the stacked direction of battery cells 11 so as to always press battery stacked body 10 in an arbitrary state among the environmental temperature (ambient temperature) and the charging rate of a range used as the power source device. For example, when the environmental temperature is low or a discharge is carried out, battery cell 11 is contracted. According to this configuration, battery stacked body 10 can be constrained even in a state of a contracted size.

Through-holes 21 for fixing are formed at end plate 20, and fastening member 300 such as a bolt is inserted into through-hole 21. Battery module 100 is fixed to frame 200 through fastening members 300 inserted into through-holes 21 formed at end plates 20. Here, the configuration in which battery module 100 is mounted on frame 200, is shown in FIG. 1. However, it does not necessarily need to mount battery module 100 on frame 200. Many types of the configurations, for example, a structure where frame 200 hangs down battery module 100, can be adopted.

Constraining members 30 include plate-shaped main body portions 31 which are respectively disposed along the two facing surfaces of battery stacked body 10, and connecting portions 32 which are fixed to end plates 20. Here, the two facing surfaces of battery stacked body 10 where main body portions 31 of constraining members 30, are adjacent to the pair of the end surfaces where end plates 20 are disposed, or fastening surface 200a where battery module 100 is fixed. In order to constrain battery stacked body 10 by equal strength, it is necessary that constraining members 30 are disposed at the two facing surfaces of battery stacked body 10. Additionally, also in order to avoid mechanically interfering with the fixing structure of frame 200 and battery module 100, main body portions 31 of constraining members 30 are disposed along both side surfaces of battery stacked body 10 adjacent to fastening surface 200a.

Main body portion 31 and connecting portion 32 of constraining member 30 are formed by bending a plate, and then through-holes in which connecting member 33 such as a screw or a rivet is inserted, are formed. Constraining members 30 are fixed to end plates 20 by connecting members 33 which are inserted into the through-holes of connecting portions 32. Constraining members 30 fixed to end plates 20, can suppress displacement of end plates 20. Battery cell 11 including the outer can having the flat rectangular parallelepiped shape, is swollen so as to extend outside to the center of battery cell 11 by a charge or degradation. However, this configuration suppresses the swells of battery cells 11 constituting battery stacked body 10.

As mentioned above, constraining members 30 are configured so as to always press battery stacked body 10 in an arbitrary state among the environmental temperature (ambient temperature) and the charging rate of a range used as the power source device. Namely, the tensile force toward the stacked direction is always applied to constraining member 30. As constraining member 30 has strength against this tensile force, the deformation of constraining member 30 and the displacement of end plate 20 can be suppressed, and then the swell of battery cell 11 can be suppressed.

As shown in FIG. 1, a plurality of openings are formed at main body portion 31 of constraining member 30. The openings formed at main body portion 31 contribute to weight-saving of constraining member 30. Constraining member 30 needs strength to some degree so as to suppress the swell of battery cell 11, and on the other hand, it is not preferable that the weight of battery module 100 is increased. Therefore, it is necessary that constraining member 30 is reduced in weigh while maintaining the strength to some degree. In order to reduce in weight while maintaining the strength, the configuration where openings are provided at plate-shaped constraining member 30, is effective. By providing such openings, decrease of the strength is kept at the minimum degree, and the weight-saving of constraining member can be carried out.

Here, in a case where the gaps between battery cell 11 and spacer 13 are formed, it is preferable that the openings formed at main body portion 31 are formed corresponding to the gaps provided between spacer 13 and battery cell 11. According to this configuration, a cooling wind blown from the openings of constraining member 30 can pass the gaps formed between spacer 13 and battery cell 11.

Figure 4:
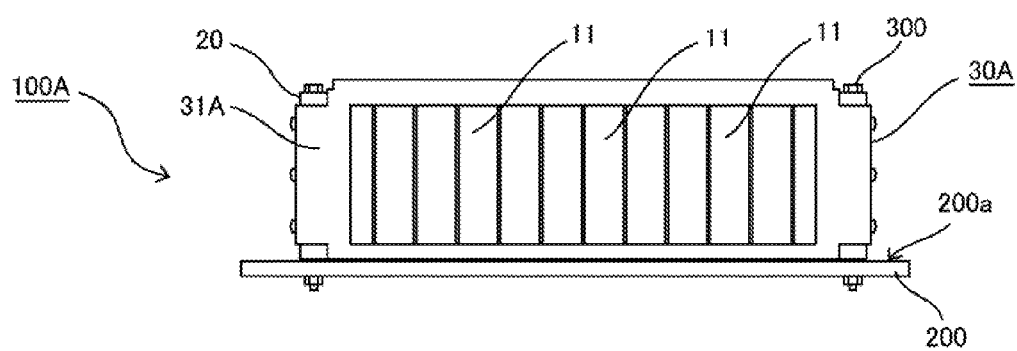
FIG. 4 is a side view of a battery module of a first comparative example.
Figure 5:
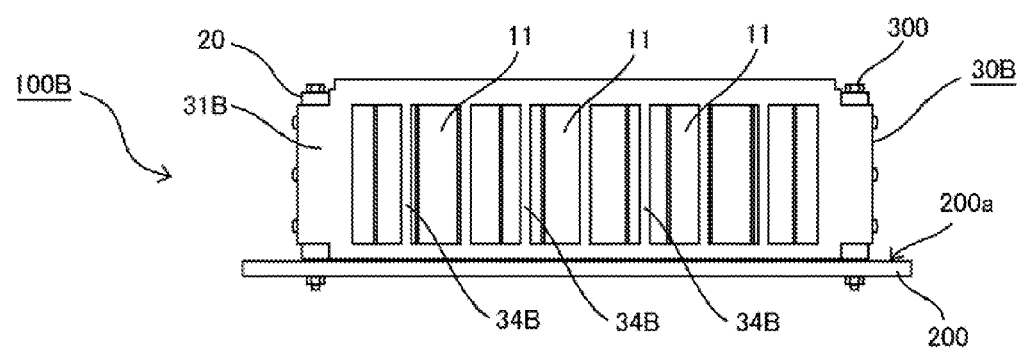
FIG. 5 is a side view of a battery module of a second comparative example.
Figure 6:
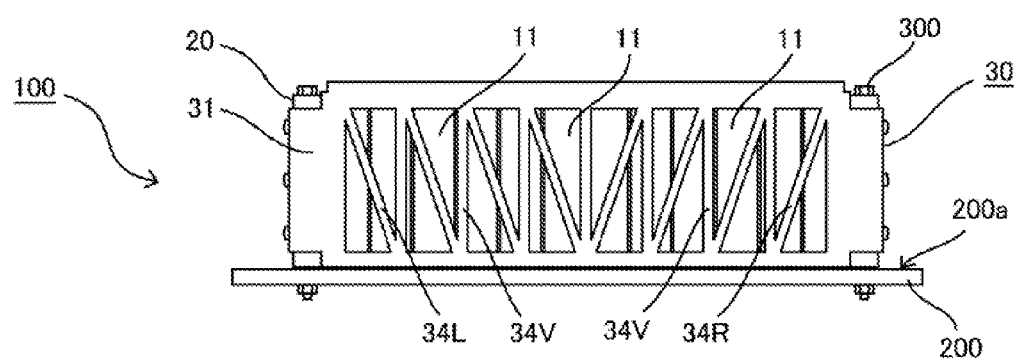
FIG. 6 is a side view of a battery module of the embodiment of the present invention.

Next, shapes of the openings provided at main body portion 31 and the strength of constraining member will be explained. Constraining members of openings having three pattern shapes including the embodiment of the present invention, are respectively illustrated as FIG. 4, FIG. 5, and FIG. 6. FIG. 4 and FIG. 5 shows constraining members of comparative examples to the present invention, and FIG. 6 shows the constraining member of the embodiment of the present invention.

FIG. 4 is a side view of battery module 100A of a first comparative example. Battery module 100A has constraining member 30A where a large opening is formed at main body portion 31A. Constraining member 30A has the shape where two bars extend at both sides of the openings formed at main body portion 31A. In constraining member 30A, two bars extending in the stacked direction, suppress the swells of battery cells 11.

The member having the bar shape extending in one direction, has comparatively high strength against the tensile force in the extending direction. In contrast, as buckling occurs by compression force in the extending direction, the strength against the compression force is weak, compared with the strength against the tensile force. Additionally, as the force in the direction perpendicular to the extending direction is applied to the shearing direction, the strength against the force in the direction perpendicular to the extending direction is remarkably weak, compared with the strength in the extending direction. In constraining member 30A, two bars of constraining member 30A extend along the stacked direction of the battery cells.

As mentioned above, constraining members 30 are configured so as to always press battery stacked body 10 in an arbitrary state among the environmental temperature (ambient temperature) and the charging rate of a range used as the power source device. Therefore, even when the battery cell is contracted, the tensile force applied to the constraining member 30 becomes only weak. Basically, as the compression force in the stacked direction of the battery cells is not applied to the constraining member, the strength against the compression force in the extending direction of constraining member 30A, does not cause problem. Further, as the extending direction of the bar coincides with the stacked direction, the strength against the tensile force in the stacked direction caused by the swells of the battery cells, is adequate.

However, in a case where the power source device is mounted on the vehicle, the external force in the upper-lower direction by vibration of the vehicle is applied to the battery module. When the external force in the upper-lower direction is large, the constraining member needs the strength in the direction perpendicular to the extending direction in addition to the strength of the extending direction FIG. 5 is a side view of battery module 100B of a second comparative example, and shows constraining member 30B having the strength against the force applied in the vertical direction. A plurality of openings are formed at main body portion 31B of constraining member 30B. Reinforcing portions 34B extending in the vertical direction to the stacked direction of battery cells 11, are provided between the adjacent openings. Compared with constraining member 30A of FIG. 4, as reinforcing portions 34B extend in the vertical direction to the stacked direction of the battery cells, the strength against the force in the vertical direction can be enhanced. Accordingly, for example, in a case where the power source device is mounted on the vehicle in which the vibration is comparatively big at time of the vehicle traveling, it is preferable that constraining member 30B of FIG. 5 is provided.

FIG. 6 is a side view of battery module 100 having constraining member 30 of the above-mentioned embodiment of the present invention. A plurality of openings are formed at constraining member 30, and reinforcing portions are provided between the adjacent openings. As shown in FIG. 6, the plurality of the reinforcing portions extend in the direction crossing the stacked direction in a plan view. Concretely, the plurality of the reinforcing portions include three types of reinforcing portions extending in different directions.

Figure 7:
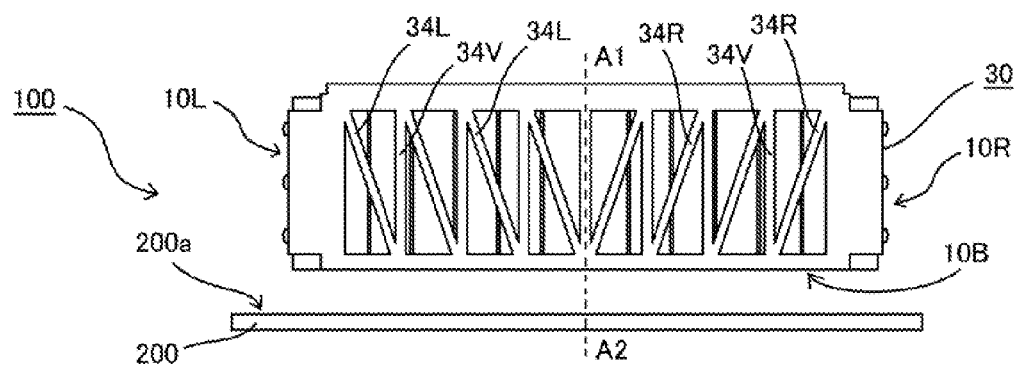
FIG. 7 is a side view of the battery module illustrating extending directions of reinforcing members in the embodiment of the present invention.

Here, the extending directions of the reinforcing portions will be explained, by using or describing the pair of the end surfaces of the battery stacked body, and fastening surface 200a on which the battery module is fixed. As shown in FIG. 7, one of the pair of the end surfaces in battery stacked body 10 is first end surface 10L, and the other thereof is second end surface 10R. A surface of battery stacked body 10 facing fastening surface 200a is bottom surface 10B. In a plan view, first reinforcing portions 34L are provided at first end surface 10L side of the central axis A1-A2 of constraining member 30, and second reinforcing portion 34R is provided at second end surface 10R side thereof. Third reinforcing portions 34V are provided equally from first end surface 10L to second end surface 10R. First reinforcing portions 34L extend along a first direction crossing from first end surface 10L to bottom surface 10B. Concretely, the first direction is in parallel with a line which connects between an arbitrary point on first end surface 10L and an arbitrary point on bottom surface 10B. Second reinforcing portions 34R extend along a second direction crossing from second end surface 10R to bottom surface 10B. Concretely, the second direction is in parallel with a line which connects between an arbitrary point on second end surface 10R and an arbitrary point on bottom surface 10B. Namely, first reinforcing portion 34L extends in a direction where first reinforcing portion 34L approaches first end surface 10L as first reinforcing portion 34L goes away from fastening surface 200a, and second reinforcing portion 34R extends in a direction where second reinforcing portion 34R approaches second end surface 10R as second reinforcing portion 34R goes away from fastening surface 200a. Additionally, third reinforcing portions 34V extend along the direction perpendicular to the stacked direction of battery cell 11.

Next, in the power source device having the above-mentioned configuration, the displacement of end plates 20 will be explained in a case where battery cells 11 are swollen. Constraining member 30 maintains a distance between the pair of end plates 20 at a fixed distance, but strictly speaking, constraining member 30 is deformed a little, and then end plates 20 are displaced. As mentioned above, end plates 20 are also fixed to frame 200. As frame 200 is a frame of the vehicle body or an outer case which stores a plurality of battery modules 100, frame 200 is a comparatively large structure, compared with constraining member 30 of battery module 100. Therefore, substantially, frame 200 is hardly deformed, compared with the deformation amount of constraining member 30. The inventors of the present invention find out the following. In battery module 100 fixed to frame 200, when battery cells 11 are swollen, the upper end of end plate 20 is largely displaced, compared with the lower end (the end portion at bottom surface 10B side). Thus, in a state where the battery module is fixed to the frame, when battery cells 11 constituting battery stacked body 10 are swollen, the end plates are asymmetrically displaced, and then it causes distortion deformation of constraining member 30 fixed to end plates 20.

Figure 8:
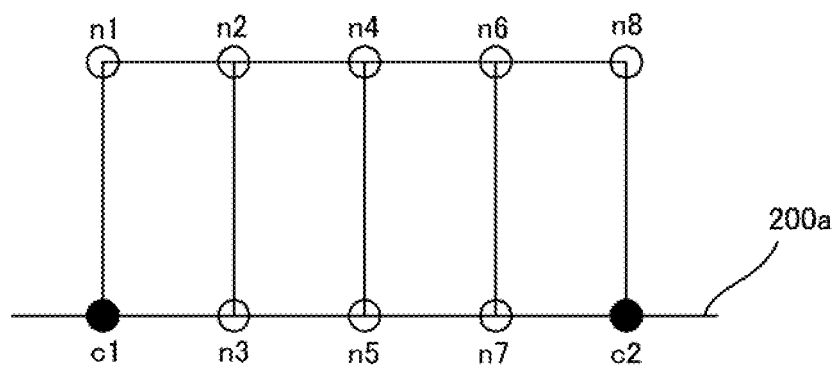
FIG. 8 is a model figure expressing a constraining member of FIG. 5.
Figure 9:
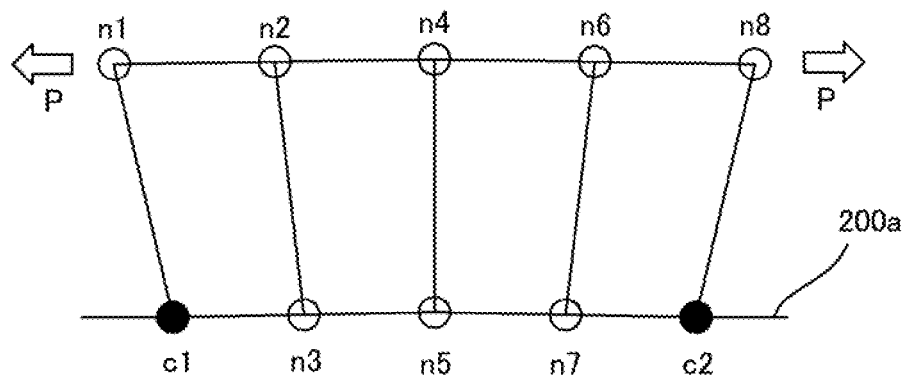
FIG. 9 is a model figure showing a state where an external force is applied to both ends of the constraining member in FIG. 8.

FIG. 8 and FIG. 9 is a simple model showing a state where the battery module having constraining member 30B of FIG. 5 is fixed to the frame. As shown in FIG. 8, constraining member 30B of this model is shown by nodal points or fulcrum points (fixing ends), and frame factors (lines) which connects the nodal points or fulcrum points. The model of FIG. 8, FIG. 9 shows constraining member 30B having three reinforcing portions 34B extending in the vertical direction to the stacked direction of battery cells 11. Concretely, the model is configured by eight nodal points n1 to n8, two fulcrum points c1, c2, and thirteen frame factors (lines). As mentioned above, the pair of the end plates connected to the constraining member, is fixed to the vehicle body, and are not substantially displaced. Therefore, also in the model of FIG. 8, the fulcrum points at both ends are shown as fixed points. As shown in FIG. 9, in this model, when the external force P by the swells of the battery cells is applied to the constraining member, the nodal points at the upper end of constraining member 30B are largely displaced. As the nodal points or fulcrum points are corresponding to the shape of constraining member 30B, FIG. 9 shows that the distortion deformation of constraining member 30B occurs in response to the displacement of the nodal points.

Figure 10:
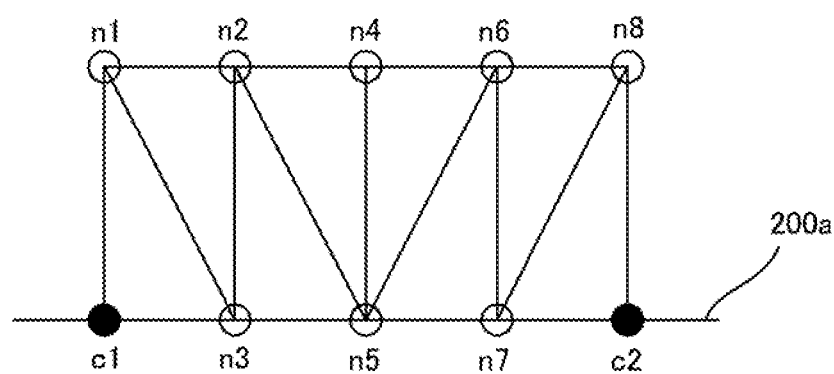
FIG. 10 is a model figure expressing a constraining member of FIG. 6.
Figure 11:
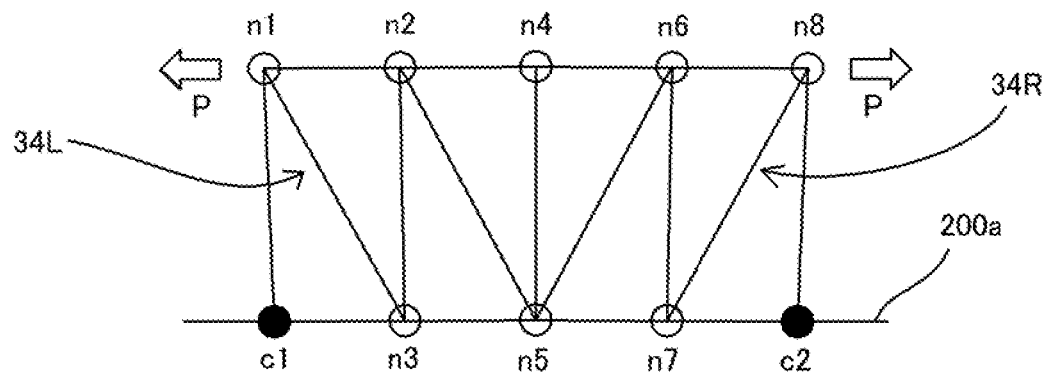
FIG. 11 is a model figure showing a state where an external force is applied to both ends of the constraining member in FIG. 10.

FIG. 10 and FIG. 11 is a simple model showing a state where the battery module having constraining member 30 in the embodiment of the present invention shown in FIG. 6 is fixed to the frame. As shown in FIG. 10, constraining member 30 of this model is shown by nodal points or fulcrum points(fixing ends), and frame factors (lines) which connects the nodal points or fulcrum points. The model of FIG. 10, FIG. 11 shows constraining member 30 having two first reinforcing portions 34L, two second reinforcing portions 34R, and three third reinforcing portion 34V. Concretely, the model is configured by eight nodal points n1 to n8, two fulcrum points c1, c2, and seventeen frame factors (lines). As mentioned above, the pair of the end plates connected to the constraining member, is fixed to the vehicle body, and are not substantially displaced. Therefore, also in the model of FIG. 10, the fulcrum points at both ends are shown as fixed points. In FIG. 10, FIG. 11, the frame factor (line) connected between nodal point n1 and nodal point n3, and the frame factor (line) connected between nodal point n2 and nodal point n4, are respectively corresponding to first reinforcing portions 34L. The frame factor (line) connected between nodal point n5 and nodal point n6, and the frame factor (line) connected between nodal point n7 and nodal point n8, are respectively corresponding to second reinforcing portions 34R. As shown in FIG. 11, in this model, even when the external force P by the swells of the battery cells is applied to the constraining member, the displacement of the nodal points at the upper end of constraining member 30 can be suppressed. Concretely, in a case where the same external force is applied, the displacement amount of the model of FIG. 11 is smaller than that of the model of FIG. 9.

Figure 12:
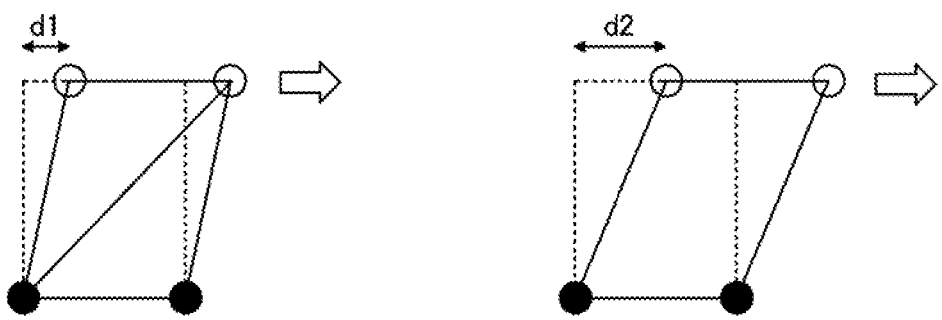
FIG. 12 is a model figure illustrating a suppressing effect of distortion deformation by a brace structure.

In constraining member 30 of the embodiment of the present invention, the reinforcing portions 34 (34L, 34V, 34R) share the external force in the extending directions of the reinforcing portions. Then, as first reinforcing portions 34L and second reinforcing portions 34R respectively configure brace structures, constraining member 30 has adequate strength against the distortion deformation of main body portion 31. Here, a relation of a brace structure and an external force is shown in FIG. 10. In the configuration where the frame factors (lines) are connected so as to form a peripheral side shape of a quadrangle, the frame factor (line) extending in a diagonal line constitutes the brace structure. As shown in FIG. 12, by providing with the brace structure, the displacement amount at the upper end can be decreased (d2−d1>0).

As mentioned above, in constraining member 30 of the embodiment of the present invention, first reinforcing portions 34L are provided at first end surface 10L side of the central axis A1-A2 of constraining member 30, and second reinforcing portion 34R is provided at second end surface 10R side thereof. As apparent from the displacement in each of the nodal points of FIG. 11, the tensile force is applied to first reinforcing portions 34L and second reinforcing portions 34R. In constraining member 30 of the embodiment of the present invention, first reinforcing portions 34L are provided at first end surface 10L side of the central axis A1-A2 of constraining member 30, and second reinforcing portion 34R is provided at second end surface 10R side thereof. Therefore, the deformation of constraining member 30 can be effectively prevented.

As mentioned above, in the configuration where battery module 100 is fixed to frame 200, the lower end of end plate 20 is hardly displaced. As the upper end of end plate 20 is fixed only by constraining member 30, the upper end of end plate 20 is displaced by the deformation of constraining member 30. In the power source device of the embodiment of the present invention, as constraining member 30 is provided with first reinforcing portion 34L and second reinforcing portion 34R, the displacement of the upper end of the end plate can be suppressed. Thus, by adopting the above-mentioned configuration of the power source device, the distortion deformation of constraining member 30 can be suppressed.

Figure 13:
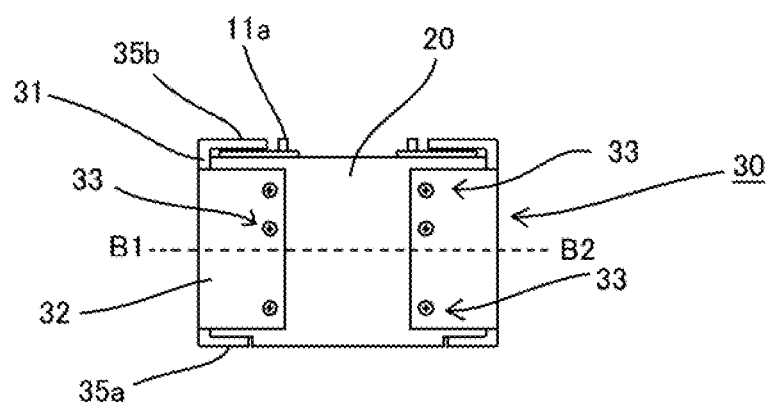
FIG. 13 is a side view of a battery module seen from an end plate side in a modified embodiment of the present invention.

FIG. 13 is a side view of battery module 100 seen from end plate 20 side of the modified example in the embodiment of the present invention. As mentioned above, connecting portions 32 of constraining members 30 are fixed to end plates 20 by connecting members 33. As shown in FIG. 13, in the modified example, connecting members 33 are unevenly disposed in end plate 20 such that each of connecting portions 32 is congested with connecting members 33 as connecting members 33 go away from the fastening surface in a direction where connecting members 33 go away from the fastening surface. Concretely, connecting members 33 are disproportionately disposed at the upper end side of end plate 20 to the central axis B1-B2 in the horizontal direction of end plate 20. By this configuration, the hardness of the upper end side of constraining member 30 can be enhanced, and then the displacement of the upper end of end plate 20 can be suppressed.

Further, as shown in FIG. 9, FIG. 11, in the model where the lower ends of the end plates are fixed as the fixed points, when the external force P by the swells of battery cells 11 is applied to the constraining member, the portion corresponding to the central portion of the battery module is also displaced upward, in addition to the displacements of the end plates. Especially, as the positions corresponding to end plates 20 is fixed as the fixed points, only the central portion of constraining member 30 is displaced upward, and then the bending deformation of constraining member 30 occurs. By such a deformation, the stress is concentrated at the inside of the bending direction. In the above-mentioned configuration, by suppressing the displacement of end plate 20, the distortion deformation of constraining member 30 is suppressed. However, the deformation is not completely prevented. Accordingly, in the configuration where battery module 100 is fixed to frame 200, the stress is concentrated at the lower end side (fastening surface 200a side) of the constraining member, when the external force caused by the swells of battery cells 11 is big.

Figure 14:
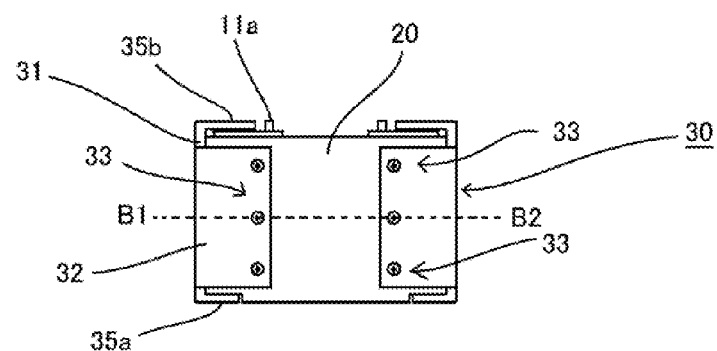
FIG. 14 is a side view of a battery module seen from an end plate side in the embodiment of the present invention.

FIG. 14 is a side view of battery module 100 seen from end plate 20. As shown in FIG. 14, constraining member 30 further has a plurality of bending portions projecting from main body portion 31 and extending in a parallel plane with fastening surface 200a. The plurality of the bending portions include first bending portion 35a disposed at the end portion of fastening surface 200a, and second bending portion 35b disposed at the end portion separated from fastening surface 200a. In the embodiment of the present invention, first bending portion 35a is disposed at the bottom surface (bottom surface 10B) side of battery cell 11, and second bending portion 35b is disposed at the electrode terminal 11a side of battery cell 11. Battery stacked body 10 is disposed between first bending portion 35a and second bending portion 35b. The movement of the upper-lower direction of battery cell 11 constituting battery stacked body 10, is regulated by first bending portion 35a and second bending portion 35b. In the embodiment of the present invention, a projecting length from main body portion 31 in first bending portion 35a is shorter than a projecting length from main body portion 31 in second bending portion 35b. First bending portion 35a is disposed at the lower end side of the constraining member. Further, by making the projecting length of second bending portion 35b short, the hardness at the lower end side of constraining member 30 may be decreased, and then the stress may be relaxed.

In the above-mentioned configuration, by having different projecting lengths from main body portion 31 of first bending portion 35a and second bending portion 35b, the hardness at the lower end side of constraining member 30 is decreased. Additionally, the hardness at the lower end side of constraining member 30 may be decreased by having different thicknesses of first bending portion 35a and second bending portion 35b, or adding the reinforcing rib and not adding the reinforcing rib.

Figure 15:
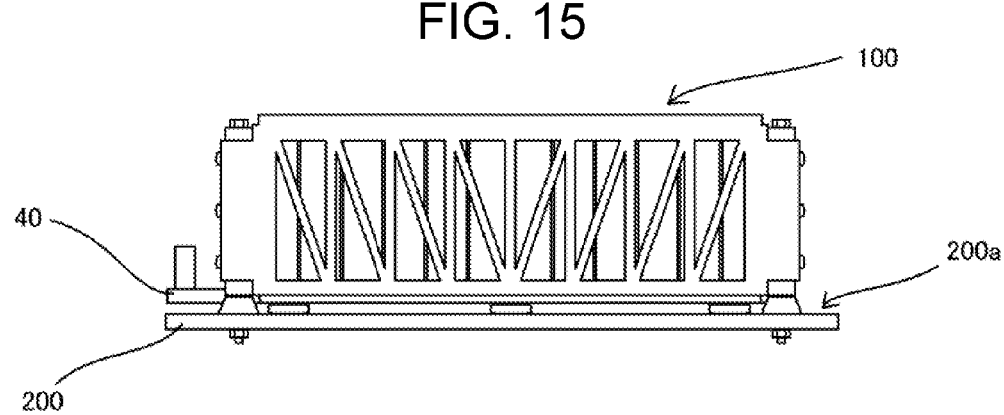
FIG. 15 is a side view of a battery module further having a cooling structure in the embodiment of the present invention.

As shown in FIG. 15, battery module 100 of the embodiment of the present invention may have a cooling device. The cooling device includes cooling jacket 40 having high heat conduction property, coolant which flows inside cooling jacket 40, and heat conduction member 41 disposed on the surface of cooling jacket 3. Cooling jacket 40 is a board material made of a metal, having a pipe inside where the coolant flows. Cooling jacket 40 is disposed between battery stacked body 10 and frame 200.

Figure 16:
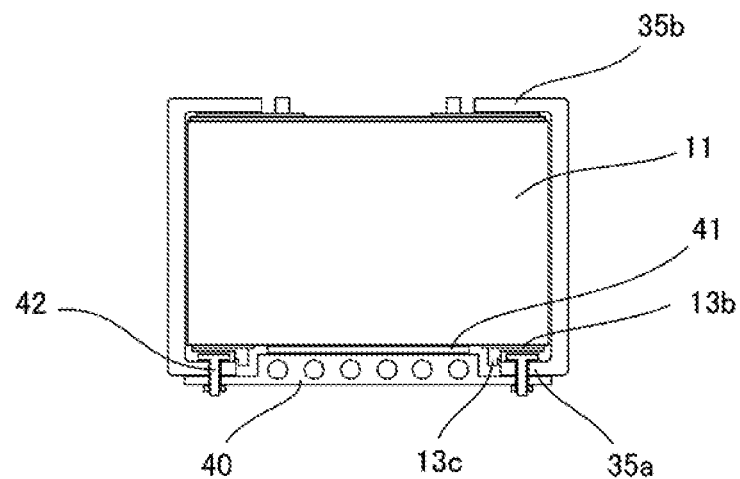
FIG. 16 is a sectional view of the battery module of FIG. 15.
Figure 17:
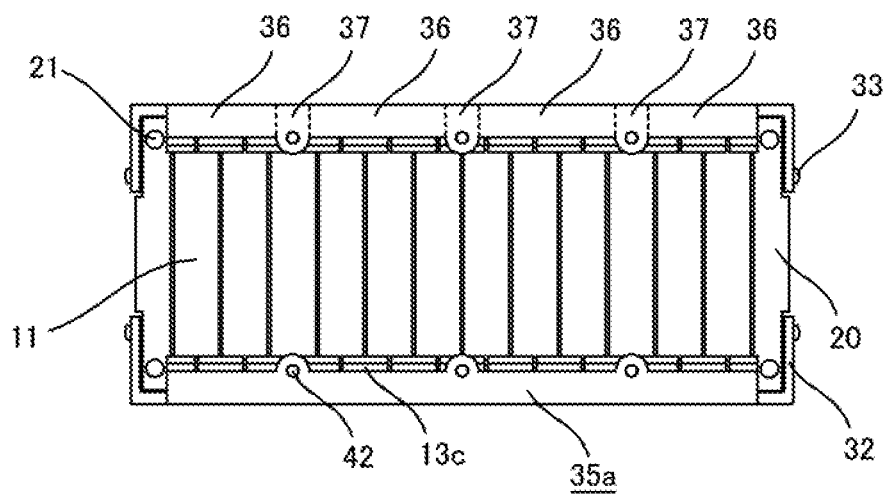
FIG. 17 is a bottom view of the battery module of FIG. 15.

FIG. 16 is a sectional view of battery module 100, and FIG. 17 is a bottom view of battery module 100. As shown in FIG. 16, insulating heat conduction member 41 is disposed between cooling jacket 40 and battery stacked body 10. Heat conduction member 41 is a member such as, for example, an insulating heat conduction sheet, an insulating silicone gel, or an adhesive. First bending portion 35a of constraining member 30 has a plurality of attaching portions where through-holes are formed respectively, and bolts 42 are inserted into the through-holes. Cooling jacket 40 are fixed to constraining member 30 by bolts 42 which are inserted into these through-holes.

In the configuration, heads of bolts 42 are located between battery stacked body 10 and first bending portions 35a of constraining member 30. As shown in FIG. 3, FIG. 16, in the embodiment of the present invention, step portions 13c are formed at lower portions of spacers 13, and step portions 13c form spaces capable of storing heads of the bolts between the spacers and first bending portions 35a. By this configuration, bolts 42 which are inserted the through-holes of first bending portions 35a, and battery stacked body 10, do not interfere with each other.

In a case where cooling jacket 40 is fixed through first bending portions 35a of constraining member 30, it is necessary that first bending portions 35a project at lengths of some extents from main body portion 31 so as to form the through-holes where bolts 42 are inserted. However, as mentioned above, it is necessary that the lengths of first bending portions 35a projecting from main body portion 31 is made short, in order to relax the stress concentration at the lower end portion of constraining member 30. Then, as shown in FIG. 17, in the embodiment of the present invention, in first bending portions 35a, first regions 36 and second regions 37 of which projecting lengths from main body portion 31 are different, are provided. Then, the plurality of the attaching portions having the through-holes into which bolts 42 are inserted, are formed at second regions 47. According to this configuration, while the battery module is provided with the cooling device, the increase of the projecting amount of first bending portion 35a can be made at the minimum extent, and then the break of constraining member 30 by the stress concentration can be prevented.

Figure 18:
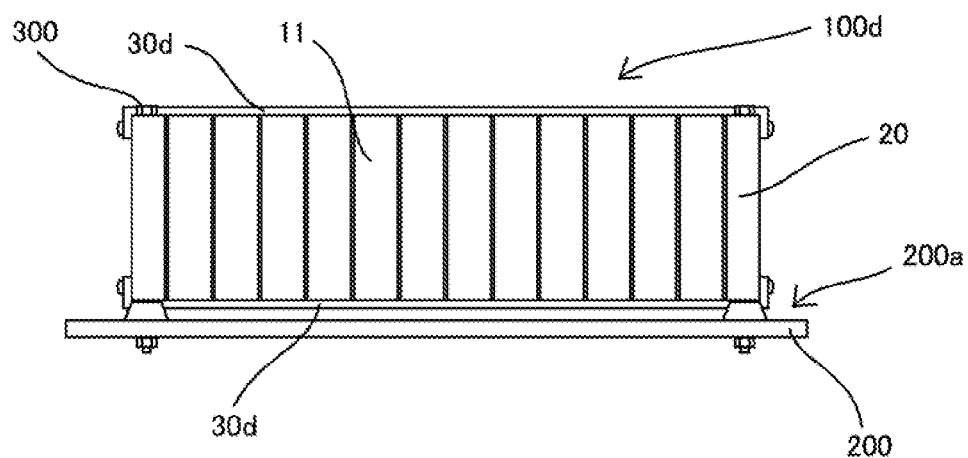
FIG. 18 is a side view of a battery module in another embodiment of the present invention.
Figure 19:
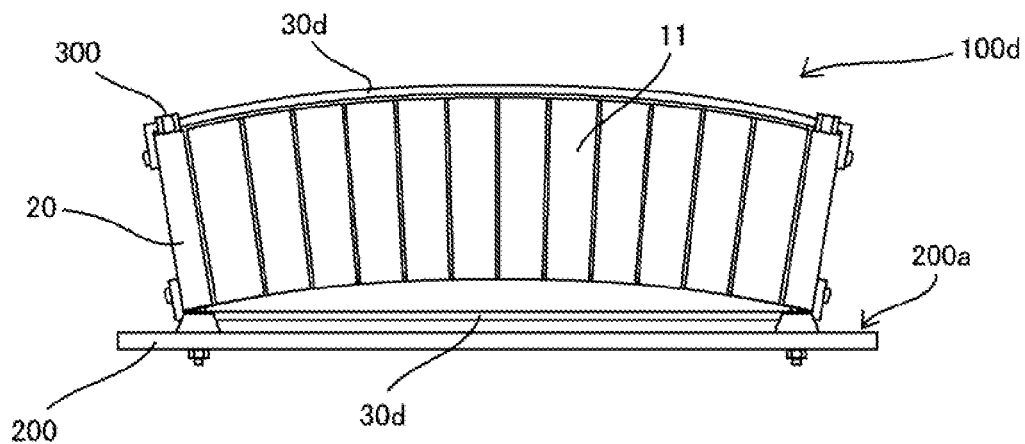
FIG. 19 is a side view of the battery module of FIG. 18 in a state where battery cells are swollen.

In the above-mentioned embodiment, mainly, the constraining member has a plate shape, but different configuration of the constraining member may be adopted. FIG. 18 is a side view of battery module 100d in another embodiment of the present invention. Even though the configuration is different, in the configuration where battery module 100 is fixed to frame 200, the lower end of end plate 20 is hardly displaced. As the upper end of end plate 20 is fixed only by constraining member 30, the upper end of end plate 20 is displaced by the deformation of constraining member 30. FIG. 19 shows the displacements of the battery cells of battery module 100d of FIG. 18 in a state where battery cells 11 are swollen.

As shown in FIG. 18, battery module 100d is provided with a pair of binding bars 30d as the constraining member, which are respectively disposed at the upper end and the lower end. Binding bars 30d are the constraining members having the bar shapes, and are coupled to the pair of the end plates 20 disposed at both ends. Binding bars 30d are disposed at the upper and lower surfaces of battery module 100d, and can be also disposed along the side surfaces of the battery module. In any one of the configuration, by enhancing the hardness of the binding bar located at the upper end side, the displacement of the upper end of end plate 20 can be suppressed. In the configuration having binding bars 30d as the constraining member, concretely, by adding the material thickness or bending processing of binding bar 30d disposed at the upper end side, the hardness of binding bar 30d disposed at the upper end side can be enhanced. Further, in this configuration, as binding bars 30d are separated from each other, by using different materials in upper or lower binding bars 30d, the hardness of binding bar 30d disposed at the upper end side can be enhanced.

Here, in a case of above-mentioned battery module 100d respectively provided with the pair of binding bars 30d as the constraining member at the upper surface and lower surface, the deformation of binding bars 30d by the displacement of end plates 20 is a little different from the above-mentioned embodiment of the present invention. the displacement of end plates 20 and the deformation of binding bars 30d will be explained based on FIG. 19, in the following, in the case of above-mentioned battery module 100d respectively provided with the pair of binding bars 30d at the upper surface and lower surface.

As mentioned above, in the configuration where the lower ends of end plates 20 are fixed as the fixed points, when the external force P by the swells of battery cells 11 is applied to the constraining member, the portion corresponding to the central portion of battery module 100d is also displaced upward, in addition to the displacements of end plates 20. Therefore, as shown in FIG. 19, the displacement of battery module 100d also occurs. Here, FIG. 19 is exaggeratedly described in order to easily understand the phenomenon. When the displacement occurs as shown in FIG. 19, binding bar 30d disposed at the lower surface side is not substantially deformed, but binding bar 30 disposed at the upper surface is pushed up upward by the battery cells located at the center portion. In this state, as the external force in the shearing direction is applied to binding bar 30d disposed at the upper surface, there is the danger that the bind bar is broken. Since such a displacement can be suppressed by suppressing the displacement of end plates 20, also in the battery module shown in FIG. 18, by enhancing the hardness of binding bar 30d disposed at the upper end side, the break or damage of the constraining members can be prevented.

The embodiments of the present invention are explained above. The above explanation is made based on the embodiments of the present invention. The person of the ordinary skill in the art can understand that these embodiments are illustrated, and these constitution elements and these combinations can be modified, and such modified examples are covered by the scope of the present invention.

The invention claimed is:

1. A power source device comprising:
   a battery module having a rectangular parallelepiped shape, including,
      a battery stacked body having a plurality of battery cells stacked in one direction,
      a pair of end plates respectively disposed on a first end surface and a second end surface located at two ends of the battery stacked body, and
      a constraining member coupled to the pair of the end plates,
   a frame having a fastening surface; and
   fastening members for fastening the battery module in such a state that one surface of the battery module adjacent to the first end surface and the second end surface faces the fastening surface,
   wherein the constraining member is formed such that a hardness of the constraining member becomes stronger against an external force applied to a stacked direction of the plurality of battery cells as the constraining member goes away from the fastening surface.

2. The power source device according to claim 1,
wherein the constraining member includes a main body portion disposed along a side surface of the battery module, which is adjacent to the fastening surface, the first end surface, and the second end surface, and the main body portion includes: a first reinforcing portion which is closer to the first end surface than to the second end surface and extends along a first direction where the first reinforcing portion approaches the first end surface as the first reinforcing portion goes away from the fastening surface; and a second reinforcing portion which is closer to the second end surface than the first end surface and extends along a second direction where the second reinforcing portion approaches the second end surface as the second reinforcing portion goes away from the fastening surface.

3. The power source device according to claim 2,
wherein the main body portion further includes a third reinforcing portion which extends in a third direction perpendicular to the stacked direction.

4. The power source device according to claim 1,
wherein the constraining member includes a main body portion disposed along a side surface of the battery module, which is adjacent to the fastening surface, the first end surface, and the second end surface, and connecting portions projecting from the main body and located outside the end plates to the battery stacked body, and the pair of the end plates are respectively connected to the connecting portions of the constraining member by connecting members, and the connecting members are unevenly disposed such that each of connecting portions is congested with the connecting members as the connecting members go away from the fastening surface in a direction where the connecting members go away from the fastening surface.

5. The power source device according to claim 1,
wherein the constraining member includes a main body portion disposed along a side surface of the battery module, which is adjacent to the fastening surface, the first end surface, and the second end surface, and a plurality of bending portions projecting from the main body portion and extending in a parallel plane with the fastening surface, the battery stacked body is sandwiched and fixed between the plurality of the bending portions, the plurality of the bending portions configure a first bending portion close to the fastening surface, and a second bending portion separated from the fastening surface, and a projecting length from the main body portion in the first bending portion is shorter than a projecting length from the main body portion in the second bending portion.

6. The power source device according to claim 5,
further comprising a cooling jacket disposed between the battery module and the frame, and thermally contacting the battery stacked body, wherein the first bending portion has an attaching portion where a bolt for fixing the cooling jacket is provided, and the cooling jacket is fixed to the constraining member by the bolt.

7. The power source device according to claim 6,
wherein the battery module further includes a plurality of spacers which are respectively disposed between adjacent ones of the plurality of the battery cells, and the plurality of the spacers respectively includes step portions at a lower portion thereof, and the step portions form a space capable of storing a head of the bolt between the plurality of the spacers and the first bending portion.

8. The power source device according to claim 7,
wherein the first bending portion includes a first region and a second region of which projecting lengths from the main body portion are different, and the attaching portion is formed at the second region of which the projecting length is longer than the projecting length of the first region.

* * * * *